(12) United States Patent
Shimizu (10) Patent No.: US 8,730,516 B2
(45) Date of Patent: May 20, 2014

(54) IMAGE READING DEVICE, IMAGE READING METHOD, AND IMAGE FORMING APPARATUS

(75) Inventor: Kosuke Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 141 days.

(21) Appl. No.: 13/405,037

(22) Filed: Feb. 24, 2012

(65) Prior Publication Data

US 2013/0050774 A1 Feb. 28, 2013

(30) Foreign Application Priority Data

Aug. 31, 2011 (JP) ................. 2011-188821

(51) Int. Cl.
*G06K 15/00* (2006.01)
*H04N 1/04* (2006.01)
*G03G 15/00* (2006.01)

(52) U.S. Cl.
USPC ............................. 358/1.18; 358/498; 399/82

(58) Field of Classification Search
USPC .................................... 358/1.18, 498; 399/82
See application file for complete search history.

(56) References Cited

U.S. PATENT DOCUMENTS

2006/0291013 A1* 12/2006 Shimizu .................. 358/498

FOREIGN PATENT DOCUMENTS

JP 2000-136030 A 5/2000

* cited by examiner

*Primary Examiner* — Charlotte M Baker
(74) *Attorney, Agent, or Firm* — Sughrue Mion, PLLC (57) ABSTRACT

An image reading device includes a document tray on which documents having different sizes are stacked; a document transport mechanism that sequentially feeds and transports the documents one-by-one; an image data generator extending in a width direction that intersects a document moving direction and having an image reading sensor that repeatedly reads, in the width direction, an image from each document, the image data generator generating image data expressing an image within a target reading region of a currently fed document by permitting the image reading sensor to perform a reading process to a region protruding from the target reading region so as to cause the image reading sensor to perform the reading process over a reading region that does not cause unread parts within the target reading region; an image memory storing the image data; and an image extractor extracting the image data from the stored image data.

6 Claims, 5 Drawing Sheets

IMAGE READING DEVICE, IMAGE READING METHOD, AND IMAGE FORMING APPARATUS

CROSS-REFERENCE TO RELATED APPLICATIONS

This application is based on and claims priority under 35 USC 119 from Japanese Patent Application No. 2011-188821 filed Aug. 31, 2011.

BACKGROUND (i) Technical Field

The present invention relates to an image reading device and an image reading method for reading an image from a document, and to an image forming apparatus equipped with such an image reading device.

SUMMARY

According to an aspect of the invention, there is provided an image reading device including a document tray, a document transport mechanism, an image data generator, an image memory, and an image extractor. On the document tray, documents having images recorded thereon are placed in a stacked manner. The document tray allows a mixture of the documents having different sizes to be placed thereon. The document transport mechanism sequentially feeds and transports the documents placed on the document tray in a one-by-one manner. The image data generator extends in a width direction intersecting a moving direction of each document transported by the document transport mechanism and has an image reading sensor that repeatedly reads, in the width direction, the image from each document fed and transported from the document tray. The image data generator generates image data expressing an image within a target reading region of a currently fed document from the document transport mechanism by permitting the image reading sensor to perform a reading process to a region protruding from the target reading region so as to cause the image reading sensor to perform the reading process over a reading region that does not cause unread parts within the target reading region. The image memory stores the image data generated by the image data generator and expressing the image within the target reading region. The image extractor extracts the image data expressing the image within the target reading region from the image data stored in the image memory.

BRIEF DESCRIPTION OF THE DRAWINGS

Exemplary embodiment(s) of the present invention will be described in detail based on the following figures, wherein.

DETAILED DESCRIPTION

An image reading device and an image forming apparatus according to specific exemplary embodiments of the present invention will be described below with reference to the drawings.

Figure 1:
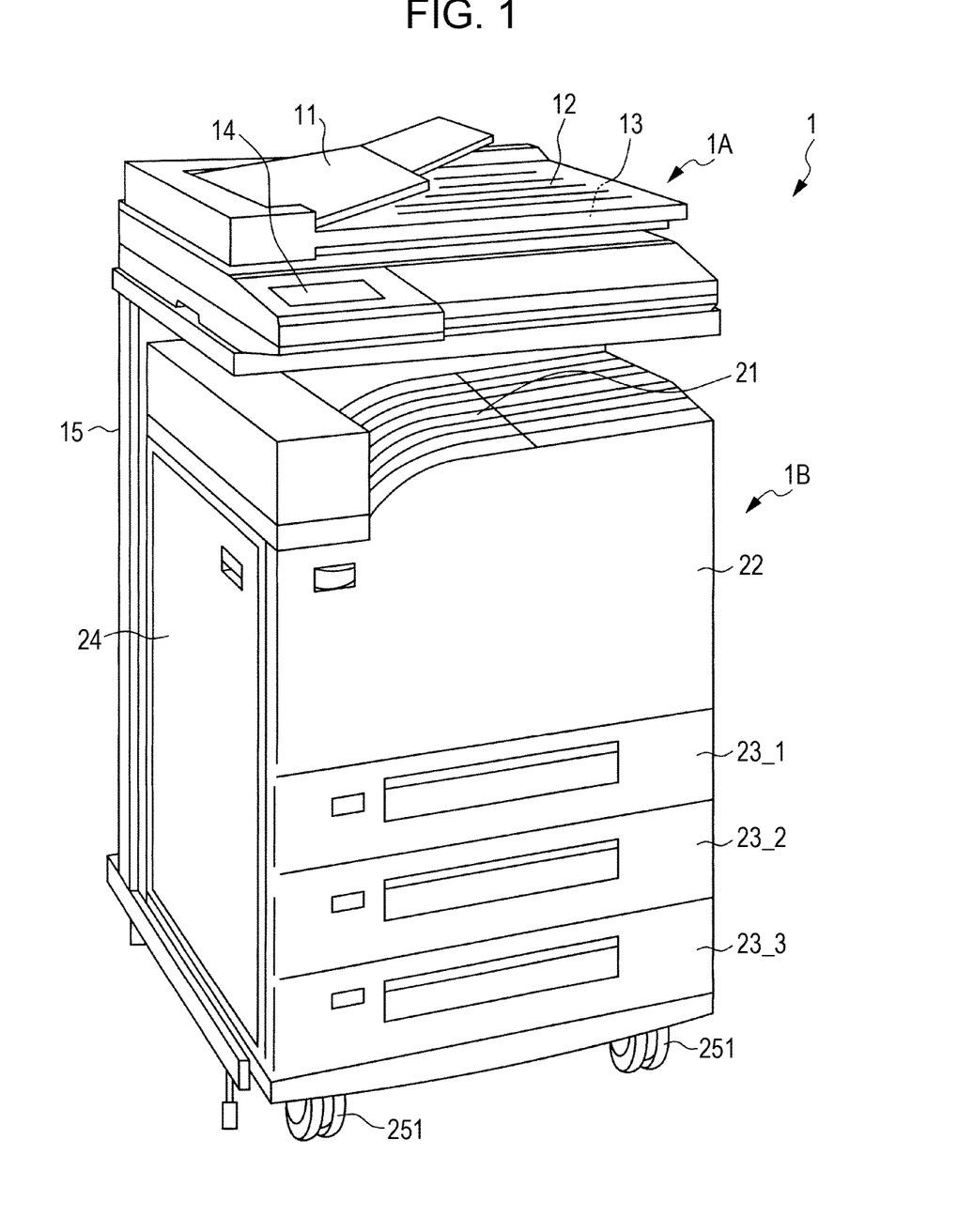
FIG. 1 is an external perspective view of a copier serving as an example of an image forming apparatus.

FIG. 1 is an external perspective view of a copier 1 serving as an example of an image forming apparatus.

The copier 1 has an image reading section 1A and an image forming section 1B.

The image reading section 1A corresponds to an example of an image reading device according to an exemplary embodiment of the present invention, and also corresponds to an example of an image reading section in an image forming apparatus according to an exemplary embodiment of the present invention. Furthermore, the image forming section 1B corresponds to an example of an image forming section according to an exemplary embodiment of the present invention.

The image reading section 1A includes a document tray 11 on which documents with images recorded thereon are placed in a stacked manner. In the present exemplary embodiment, a group of documents including a mixture of documents of different sizes (i.e., documents of mixed sizes), such as A4-size documents and A3-size documents, can be placed on the document tray 11. The document tray 11 corresponds to an example of a document tray according to an exemplary embodiment of the present invention.

The documents placed on the document tray 11 are sequentially fed and transported in a one-by-one manner, and the images recorded on the documents are read before the documents are output onto a document output tray 12. In this case, text, drawings, or photographs recorded on the documents will collectively be referred to as "images".

The image reading section 1A has a hinge extending horizontally at the rear side thereof, such that the document tray 11 and the document output tray 12 can be lifted upward together about the hinge acting as the center of rotation. A document read plate 13 (see FIG. 2) made of transparent glass extends below the document tray 11 and the document output tray 12. Instead of placing documents on the document tray 11, the image reading section 1A allows a single document to be placed facing downward on the document read plate 13 so as to read text or an image from the document on the document read plate 13.

A display operating portion 14 is provided in front of the document read plate 13. The display operating portion 14 displays various messages to the user and also displays various operable buttons through which a document reading command, an image forming command, and the like can be received from the user.

The image reading section 1A is entirely supported by a support frame 15.

The upper surface of the image forming section 1B is provided with a sheet output tray 21 onto which a sheet having an image formed thereon is output. The front surface of the image forming section 1B is provided with a front cover 22 that may be opened for replacement of components, such as toner containers, or for removing a sheet that has been jammed during transportation. Sheets that have not yet undergone image forming operation are accommodated and stacked in three drawer-type sheet feed trays 23_1, 23_2, and 23_3 disposed below the front cover 22.

The left side surface of the image forming section 1B is provided with a side cover 24 that may be opened when removing a jammed sheet.

Furthermore, wheels 251 that allow the image forming section 1B to move are attached to the bottom surface of the image forming section 1B.

Figure 2:
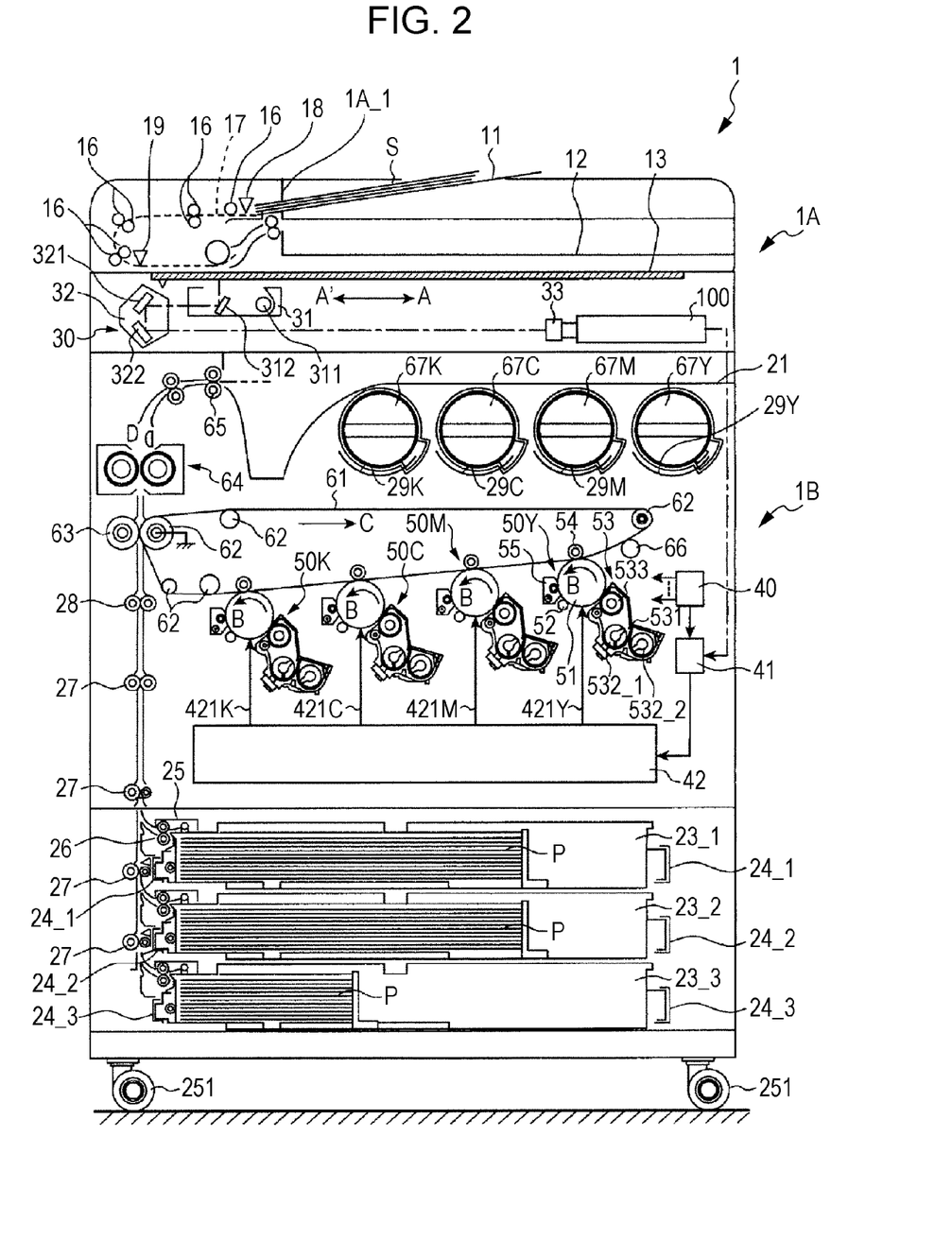
FIG. 2 is an internal configuration diagram of the copier shown in the external view in FIG. 1.

FIG. 2 is an internal configuration diagram of the copier shown in the external view in FIG. 1.

A document reading optical system 30 is disposed below the transparent-glass document read plate 13. The document reading optical system 30 has a first block 31, a second block 32, and a charge coupled device (CCD) 33. The first block 31 has a light-emitting diode (LED) 311 and a mirror 312. The second block 32 has two mirrors 321 and 322. The CCD 33 extends in a width direction that intersects a moving direction of each transported document S, and generates an image signal by repeatedly reading the image from the transported document S in the width direction. In the present exemplary embodiment, the CCD 33 corresponds to an example of an image reading sensor according to an exemplary embodiment of the present invention.

The first block 31 and the second block 32 are movable along the document read plate 13 in a direction indicated by an arrow A-A' and are positioned at the left side shown in FIG. 2 in their initial state.

The documents S placed on the document tray 11 are fed one-by-one by multiple transport rollers 16 arranged on a movement path 17 that is adjacent to the document read plate 13. Each document S is transported along the movement path 17 by the transport rollers 16. The document S is irradiated with light from the LED 311 as the document S is transported in contact with the document read plate 13. Reflected light from the document S is reflected by the mirrors 312, 321, and 322 and is read in the width direction by the CCD 33. The CCD 33 generates an analog image signal that expresses the image recorded on the document S. The document S irradiated with the light from the LED 311 is further transported so as to be delivered onto the document output tray 12.

In a case where a document is placed on the document read plate 13, the first block 31 and the second block 32 move in the direction of the arrow A in a manner such that an equal optical distance between a document reading position on the document read plate 13 and the CCD 33 is always maintained. During the movement of the first block 31 and the second block 32, the LED 311 emits light to the document, and the CCD 33 reads an image from the document so as to generate an analog image signal.

The analog image signal obtained by the CCD 33 is input to a read controller 100. The image signal obtained by the CCD 33 expresses red (R), green (G), and blue (B) colors. The read controller 100 converts this RGB image signal into digital image data including four colors, i.e., yellow (Y), magenta (M), cyan (C), and black (K) colors, and temporarily stores the digital image data. The digital image data is transmitted to an exposure controller 41 in accordance with an exposure timing for latent-image formation, to be described later.

In order for the read controller 100 to determine a width (reading width), extending in a direction intersecting the moving direction of the document S, of a region (i.e., reading region) within which the document reading optical system 30 performs an image reading process, the image reading section 1A is equipped with a reading-width determination sensor 18 that detects the passing of the document S. In the present exemplary embodiment, the reading region is determined such that there are no unread parts within a target reading region, which is a region to be read on the document S. In the present exemplary embodiment, the target reading region is a rectangular region surrounded by four sides located 2 mm inward from the four sides of the document S.

The target reading region is not limited to such a rectangular region, and may alternatively be, for example, the entire region of the document S.

The reading-width determination sensor 18 is disposed in the movement path 17 at a position near the inner side of an inlet 1A_1 for the document S and includes three sensors arranged in a direction intersecting the movement path 17.

Furthermore, the image reading section 1A is equipped with a reading-timing determination sensor 19 for determining a start timing and an end timing for a reading process to be performed by the document reading optical system 30.

The reading-timing determination sensor 19 is a single sensor disposed in the movement path 17 at a position downstream of the reading-width determination sensor 18 and upstream of the first block 31 in the document reading optical system 30.

In the present exemplary embodiment, the reading-width determination sensor 18 is disposed near the inner side of the inlet 1A_1 for the document S so that the reading-width determination sensor 18 can detect the document S immediately after the document S is fed. Alternatively, the reading-width determination sensor 18 may be disposed at any position that is upstream of the first block 31 of the document reading optical system 30. The reading-timing determination sensor 19 is disposed near the first block 31 so as to accurately detect the reading timing. Alternatively, the reading-timing determination sensor 19 may be disposed at any position that is upstream of the first block 31.

Figure 3:
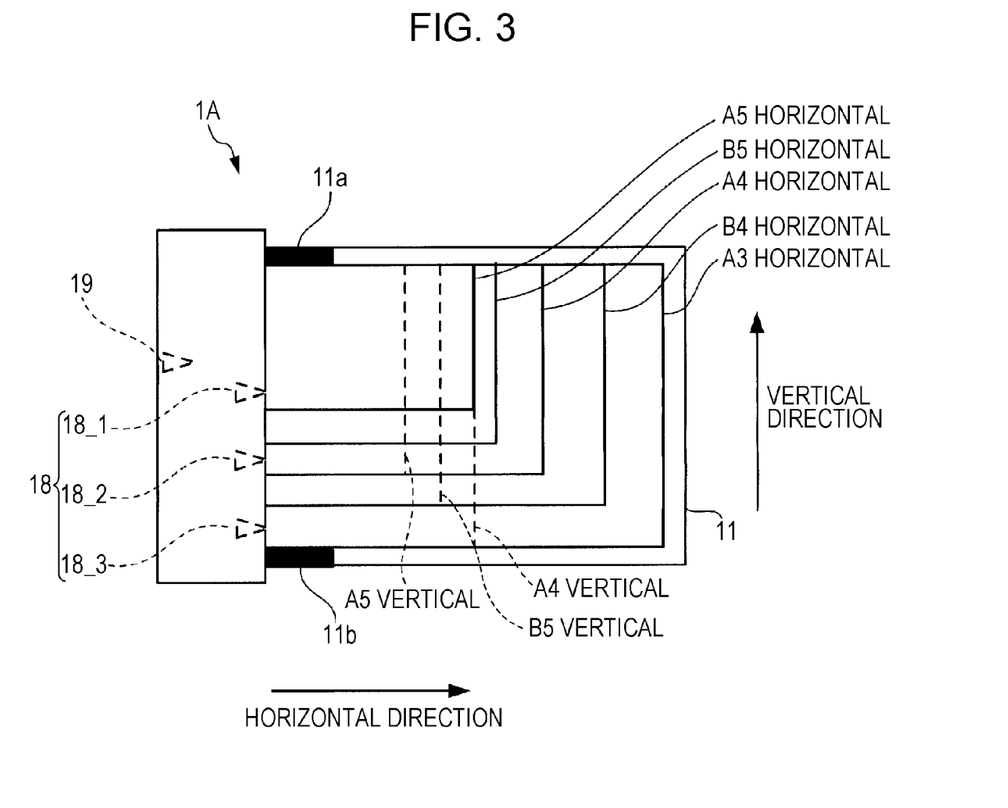
FIG. 3 schematically illustrates the positions of a reading-width determination sensor and a reading-timing determination sensor in a direction intersecting a movement path.

FIG. 3 schematically illustrates the positions of the reading-width determination sensor 18 and the reading-timing determination sensor 19 in the direction intersecting the movement path 17.

In FIG. 3, a top view of the image reading section 1A is shown together with the reading-width determination sensor 18 and the reading-timing determination sensor 19 disposed inside the image reading section 1A.

Furthermore, FIG. 3 also shows the sizes of documents that can be placed on the document tray 11, as well as placeable positions of documents on the document tray 11.

In the present exemplary embodiment, A3-size, B4-size, A4-size, B5-size, and A5-size documents can be placed on the document tray 11. The A3-size and B4-size documents can only be placed in a horizontal position in which the longitudinal direction thereof is aligned with the horizontal direction of the drawing. On the other hand, the A4-size, B5-size, and A5-size documents can be placed in either the aforementioned horizontal position or a vertical position in which the longitudinal direction thereof is aligned with the vertical direction of the drawing.

With regard to the document tray 11 in the present exemplary embodiment, the document S is placed thereon such that the upper left corner of the document S is aligned with the upper left corner of the document tray 11. The document tray 11 includes a sidewall 11a fixed at the upper left corner of the document tray 11 and a damper 11b that can be slid by the user in the direction intersecting the movement path 17. The damper 11b is slid by the user to a position where the damper 11b abuts on the lower edge of a document S with the largest width in the vertical direction among the group of documents of mixed sizes. With regard to the remaining documents S in the group of documents of mixed sizes, the upper left corners of the documents S are aligned with the upper left corner of the document tray 11 by the user.

As an example of a document tray according to an exemplary embodiment of the present invention, the document tray 11 in the present exemplary embodiment has a single damper 11b extending along the lower edges of the documents S in the drawing. However, the document tray according to the exemplary embodiment of the present invention is not limited to this type and may alternatively have, for example, two dampers that sandwich the documents in the vertical direction in the drawing. As a further alternative, the document tray according to the exemplary embodiment of the present invention may be a tray not equipped with a damper. In that case, the positioning of the documents is left to how the user places the documents on the tray.

In the present exemplary embodiment, the reading-width determination sensor 18 includes a first sensor 18_1, a second sensor 18_2, and a third sensor 18_3 that are arranged in the direction intersecting the movement path 17.

The first sensor 18_1 is disposed at a position where every document passes the first sensor 18_1, regardless of whether documents of any size placeable on the document tray 11 are fed in the horizontal position or the vertical position.

The second sensor 18_2 is disposed at a position where an A4-size document in the horizontal position, a B4-size document in the horizontal position, an A3-size document in the horizontal position, an A5-size document in the vertical position, a B5-size document in the vertical position, and an A4-size document in the vertical position pass the second sensor 18_2 when each document is fed into the image reading section 1A.

The third sensor 18_3 is disposed at a position where an A3-size document in the horizontal position and an A4-size document in the vertical position pass the third sensor 18_3 when each document is fed into the image reading section 1A.

Each sensor outputs a document passing signal while a currently fed document S passes the sensor. The signal output from each sensor is input to the read controller 100 shown in FIG. 2.

In the present exemplary embodiment, when an A5-size document in the horizontal position and a B5-size document in the horizontal position are fed, only the first sensor 18_1 outputs a document passing signal. Accordingly, a group of documents corresponding to a document passing signal output only from the first sensor 18_1 of the reading-width determination sensor 18 will be referred to as "first document group". In other words, a document group to which an A5-size document in the horizontal position and a B5-size document in the horizontal position belong will be referred to as "first document group".

The first sensor 18_1 also functions as a sensor that detects that a document has been fed from the document tray 11. Specifically, if a document passing signal is not output from the first sensor 18_1 within a certain period of time elapsed after the start of new document feeding operation, it is determined that there is no new document on the document tray 11, thus ending the document feeding operation.

When an A4-size document in the horizontal position, a B4-size document in the horizontal position, an A5-size document in the vertical position, and a B5-size document in the vertical position are fed, the first sensor 18_1 and the second sensor 18_2 both output document passing signals. Accordingly, a group of documents corresponding to document passing signals output from the first sensor 18_1 and the second sensor 18_2 of the reading-width determination sensor 18 will be referred to as "second document group". In other words, a document group to which an A4-size document in the horizontal position, a B4-size document in the horizontal position, an A5-size document in the vertical position, and a B5-size document in the vertical position belong will be referred to as "second document group".

When an A3-size document in the horizontal position and an A4-size document in the vertical position are fed, the first sensor 18_1, the second sensor 18_2, and the third sensor 18_3 all output document passing signals. Accordingly, a group of documents corresponding to document passing signals output from all of the first sensor 18_1, the second sensor 18_2, and the third sensor 18_3 of the reading-width determination sensor 18 will be referred to as "third document group". In other words, a document group to which an A3-size document in the horizontal position and an A4-size document in the vertical position belong will be referred to as "third document group".

Accordingly, the reading-width determination sensor 18 having the first sensor 18_1, the second sensor 18_2, and the third sensor 18_3 identifies the document group to which a currently fed document belongs from among the first document group, the second document group, and the third document group. The reading-width determination sensor 18 corresponds to an example of a document-width identification sensor according to an exemplary embodiment of the present invention.

The read controller 100 receives the identification result obtained by the reading-width determination sensor 18 and determines a reading width for the currently fed document in the following manner.

First, if the currently fed document belongs to the first document group, a widthwise dimension of a target reading region in a B5-size document in the horizontal position whose widthwise dimension is the largest among the documents belonging to the first document group is set as the reading width.

If the currently fed document belongs to the second document group, a widthwise dimension of a target reading region of a B4-size document in the horizontal position or a B5-size document in the vertical position whose widthwise dimension is the largest among the documents belonging to the second document group is set as the reading width.

An A3-size document in the horizontal position and an A4-size document in the vertical position that belong to the third document group have the same widthwise dimension. If the currently fed document belongs to the third document group, a widthwise dimension of a target reading region in an A3-size document in the horizontal position is set as the reading width.

Next, the reading-timing determination sensor 19 will be described.

The reading-timing determination sensor 19 is disposed at a position, in the direction intersecting the movement path 17, where every document passes the reading-timing determination sensor 19, regardless of whether documents of any size placeable on the document tray 11 are fed in the horizontal position or the vertical position. The reading-timing determination sensor 19 similarly outputs a document passing signal while a currently fed document passes the reading-timing determination sensor 19. The signal output from the reading-timing determination sensor 19 is input to the read controller 100 shown in FIG. 2.

The read controller 100 sets a time point following a predetermined first time interval elapsed after receiving the output signal from the reading-timing determination sensor 19 as a start timing for a reading process to be performed by the document reading optical system 30.

In the present exemplary embodiment, the first time interval is a time period between a time point at which the leading edge of a document in the moving direction passes the reading-timing determination sensor 19 and a time point at which a position located 2 mm inward from the leading edge of the document reaches a reading position of the document reading optical system 30. Thus, the read controller 100 causes the document reading optical system 30 to start a reading process when the leading edge of the target reading region of the transported document reaches the first block 31.

Then, the read controller 100 causes the document reading optical system 30 to repeat the reading process within the reading width set in the above-described manner.

Furthermore, the read controller 100 sets a time point following a predetermined second time interval elapsed after the end of input of the output signal from the reading-timing determination sensor 19 as an end timing for the reading process performed by the document reading optical system 30.

In the present exemplary embodiment, the second time interval is a time period between a time point at which the trailing edge of the document in the moving direction passes the reading-timing determination sensor 19 and a time point at which a position located 2 mm inward from the trailing edge of the document reaches the reading position of the document reading optical system 30. Thus, the read controller 100 causes the document reading optical system 30 to end the reading process when the trailing edge of the target reading region of the transported document reaches the first block 31.

Accordingly, in the present exemplary embodiment, the reading process ends when the trailing edge of the target reading region of the document reaches the reading position of the document reading optical system 30. The image reading section 1A in the present exemplary embodiment may have a higher image reading rate than an image reading section that makes the document reading optical system 30 continue the reading process for a region protruding from the trailing edge of the target reading region.

In the present exemplary embodiment, the reading process ends at the trailing edge of the target reading region of the currently fed document. Alternatively, if the reading rate can be reduced to some extent, the reading process may be performed until reaching the trailing edge of a target reading region of a document having the largest widthwise dimension in the document group identified for the currently fed document.

In the present exemplary embodiment, the reading width set in the read controller 100 is the widthwise dimension of a target reading region of a document whose widthwise dimension is the largest in the document group identified for the currently fed document.

Therefore, if the widthwise dimension of the currently fed document is the same as the widthwise dimension of a document with the largest widthwise dimension in the document group identified for the currently fed document, the target reading region of the document matches the actually read region.

In detail, if the currently fed document is a B5-size document in the horizontal position, a B4-size document in the horizontal position, an A3-size document in the horizontal position, a B5-size document in the vertical position, or an A4-size document in the vertical position, the target reading region of the document matches the actually read region.

If the widthwise dimension of the currently fed document is different from the widthwise dimension of a document with the largest widthwise dimension in the document group identified for the currently fed document, the target reading region of the document does not match the actually read region.

In detail, if the current fed document is an A5-size document in the horizontal position, an A4-size document in the horizontal position, or an A5-size document in the vertical position, the target reading region of the document and the actually read region match in the longitudinal direction but do not match in the width direction. In that case, the reading process is also performed for a region protruding from the target reading region of the document in the width direction.

In a case where the currently fed document is an A5-size document in the horizontal position, the reading width corresponds to the widthwise dimension of a target reading region of a B5-size document in the horizontal position. In a case where the currently fed document is an A4-size document in the horizontal position or an A5-size document in the vertical position, the reading width corresponds to the widthwise dimension of a target reading region of a B4-size document in the horizontal position.

Accordingly, the present exemplary embodiment permits a reading process for a region protruding from the target reading region in the width direction. Thus, when a document of any size set in either position is fed, there are no unread parts within the target reading region on the document.

The image data used for image formation in the image forming section 1B of the copier 1 strictly expresses an image within the target reading region on the document.

Therefore, if the region read by the document reading optical system 30 includes a region protruding from the target reading region in the width direction, image data expressing the image within the target reading region is extracted from the image data converted from the image signal obtained in the reading process. In order to achieve this, the read controller 100 ascertains the position and the size of the currently fed document. In the present exemplary embodiment, the read controller 100 determines the position and the size of each document on the basis of an output period of the signal from the reading-timing determination sensor 19.

As described above, the reading-timing determination sensor 19 continuously outputs a document passing signal while a document passes the reading-timing determination sensor 19. As shown in FIG. 3, the dimension of a document in the moving direction varies depending on the position and the size (such as A4 size and B5 size) of the document. In other words, the output period of the signal from the reading-timing determination sensor 19 is an inherent value that depends on the position and the size of the document.

In the present exemplary embodiment, a memory (not shown) stores a correspondence table in which the position and the size of each document, such as an A5-size document in the horizontal position, are set in correspondence with the signal output period of the reading-timing determination sensor 19 when the document of that size in that position is fed. The read controller 100 refers to this correspondence table so as to ascertain the position and the size of the currently fed document.

Then, the read controller 100 extracts image data expressing the image within the target reading region of the document with the ascertained size in the ascertained position from the image data converted from the image signal obtained in the reading process performed by the document reading optical system 30.

The descriptions of the reading-width determination sensor 18 and the reading-timing determination sensor 19 end here, and the image forming section 1B will now be described with reference to FIG. 2. The read controller 100 included in the image reading section 1A will be described in detail later with reference to another drawing.

The image forming section 1B is equipped with an exposure unit 42. With regard to a latent image format, the exposure controller 41 sends image data for the YMCK colors to the exposure unit 42. The exposure unit 42 emits exposure light beams 421Y, 421M, 421C, and 421K modulated in accordance with the image data for the YMCK colors, respectively.

As shown in FIG. 2, a controller 40 is disposed next to the exposure controller 41. The controller 40 includes a microcomputer and a program to be executed by the microcomputer. The controller 40 is connected to the exposure controller 41, the display operating portion 14 (see FIG. 1), the read controller 100, and other various kinds of power circuits and driving circuits (not shown), and is in charge of the entire control of the copier 1.

The aforementioned three sheet feed trays 23_1, 23_2, and 23_3 are respectively supported by left and right guide rails 24_1, 24_2, and 24_3 and are accommodated in a lower portion of the image forming section 1B. The sheet feed trays 23_1, 23_2, and 23_3 each accommodate a stack of sheets P. For supplying of new sheets P, the sheet feed trays 23_1, 23_2, and 23_3 can be ejected by being guided by the guide rails 24_1, 24_2, and 24_3.

A pickup roller 25 feeds sheets P from a sheet feed tray (for example, the sheet feed tray 23_1) selected from among the three sheet feed trays 23_1, 23_2, and 23_3 by operating the display operating portion 14 (see FIG. 1). The fed sheets P are separated into individual sheets by a corresponding separation roller 26. Each of the separated sheets P is transported upward by transport rollers 27. Then, the sheet P is transported further upward while a standby roller 28 adjusts a subsequent transport timing. A description of the sheet transport process after the standby roller 28 will be provided later.

Four image forming units 50Y, 50M, 50C, and 50K that form toner images using YMCK toners are disposed in a mid-portion of the image forming section 1B. Since these four image forming units 50Y, 50M, 50C, and 50K have similar configurations except that the colors of toners used are different, the following description will be directed to the configuration of the image forming unit 50Y.

The image forming unit 50Y has a photoconductor 51 that rotates in a direction indicated by an arrow B in FIG. 2, and also has a charger 52, a developing unit 53, and a cleaner 55 that surround the photoconductor 51. Furthermore, a transfer unit 54 is disposed at a position where the transfer unit 54 and the photoconductor 51 nip an intermediate transfer belt 61, to be described later, therebetween.

The photoconductor 51 has a shape of a roller. The photoconductor 51 acquires electric charge by being electrostatically charged and releases the electric charge by being exposed to light, thereby bearing an electrostatic latent image on the surface thereof.

The charger 52 electrostatically charges the surface of the photoconductor 51 to a certain charge potential.

The image forming section 1B also has the aforementioned exposure unit 42. The exposure unit 42 receives image data from the exposure controller 41 and outputs the exposure light beams 421Y, 421M, 421C, and 421K modulated in accordance with the received image data. After being electrostatically charged by the charger 52, the photoconductor 51 is irradiated with the exposure light beam 421Y from the exposure unit 42, whereby an electrostatic latent image is formed on the surface of the photoconductor 51.

After the electrostatic latent image is formed on the surface of the photoconductor 51 irradiated with the exposure light beam 421Y, the electrostatic latent image is developed by the developing unit 53, whereby a toner image (i.e., a yellow (Y) toner image in the image forming unit 50Y) is formed on the surface of the photoconductor 51.

The developing unit 53 has a casing 531 containing a developer constituted of a toner and a carrier. In the casing 531, two augers 532_1 and 532_2 for stirring the developer and a developing roller 533 that delivers the developer to a position facing the photoconductor 51 are provided. When developing the electrostatic latent image formed on the photoconductor 51, bias voltage is applied to the developing roller 533. The bias voltage causes the toner within the developer to adhere onto the photoconductor 51 in accordance with the electrostatic latent image formed on the photoconductor 51, whereby a toner image is formed.

The toner image formed on the photoconductor 51 due to the developing process performed by the developing unit 53 is transferred onto the intermediate transfer belt 61 by the transfer unit 54.

After this transfer process, residual toner on the photoconductor 51 is removed from the photoconductor 51 by the cleaner 55.

The intermediate transfer belt 61 is an endless belt supported by multiple rollers 62 in a rotatable manner in a direction indicated by an arrow C.

The toner images formed by the image forming units 50Y, 50M, 50C, and 50K using toners of the respective colors are superposed and transferred onto the intermediate transfer belt 61 and are transported to a second transfer position where a transfer unit 63 is disposed. At the same time, a sheet transported to the standby roller 28 is transported to the second transfer position where the transfer unit 63 transfers the superposed toner image on the intermediate transfer belt 61 onto the transported sheet. The sheet having the toner image transferred thereon is further transported to a fixing unit 64 that applies pressure and heat to the sheet so as to fix the toner image onto the sheet, whereby an image produced from the fixed toner image is formed on the sheet. The sheet having the image formed thereon is further transported to a sheet output roller 65 so as to be output onto the sheet output tray 21.

After the transfer unit 63 transfers the toner image onto the sheet, the intermediate transfer belt 61 further rotates so that residual toner on the surface of the intermediate transfer belt 61 is removed therefrom by a cleaner 66.

The image forming section 1B is provided with container fitting portions 29Y, 29M, 29C, and 29K above the intermediate transfer belt 61. Toner containers 67Y, 67M, 67C, and 67K that contain yellow (Y), magenta (M), cyan (C), and black (K) toners are fitted to the container fitting portions 29Y, 29M, 29C, and 29K, respectively. The toners contained in the toner containers 67Y, 67M, 67C, and 67K are supplied to the corresponding developing units 53 in accordance with toner consumption in the developing units 53.

The copier 1 schematically has the above-described configuration.

Next, the read controller 100 included in the image reading section 1A will be described in detail.

Figure 4:
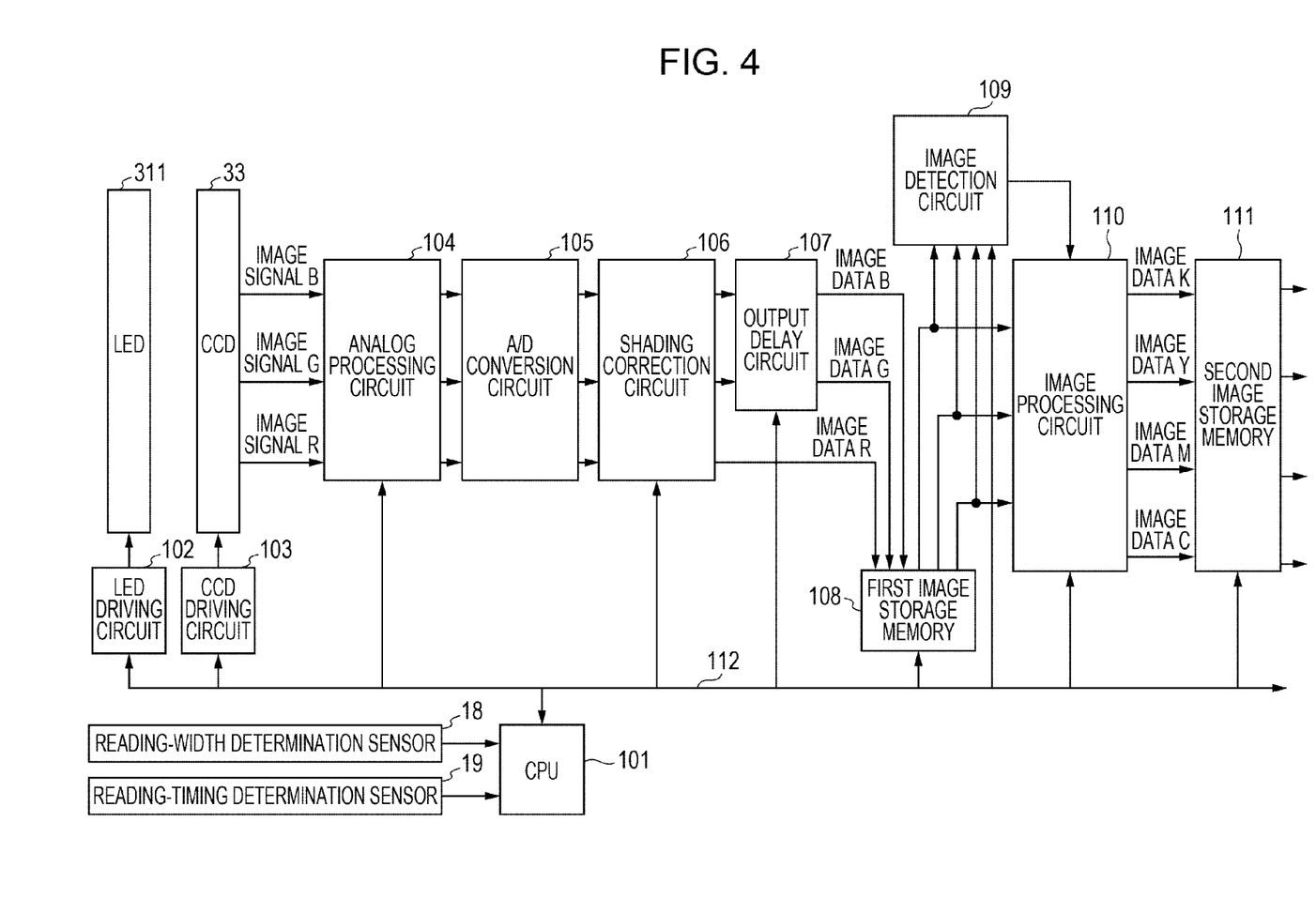
FIG. 4 is a detailed block diagram of a read controller shown in FIG. 2.

FIG. 4 is a detailed block diagram of the read controller 100 shown in FIG. 2.

The read controller 100 includes a central processing unit (CPU) 101. The CPU 101 controls the entire image reading section 1A while communicating with the controller (see FIG. 2) that is in charge of the entire control of the copier 1. The reading-width determination sensor 18 and the reading-timing determination sensor 19 described above are connected to the CPU 101, such that an output signal from the reading-width determination sensor 18 and an output signal from the reading-timing determination sensor 19 are input to the CPU 101.

The above-described reading-width determination process for the currently fed document is executed by the CPU 101 on the basis of the output signal from the reading-width determination sensor 18.

Moreover, the above-described process for determining the start timing and the end timing for reading the currently fed document is executed by the CPU 101 on the basis of the output signal from the reading-timing determination sensor 19.

Furthermore, as mentioned above, the position and the size of the currently fed document are ascertained by the CPU 101 on the basis of the output signal from the reading-timing determination sensor 19.

The CPU 101 is connected to each of components, to be described below, in the read controller 100 via a bus 112.

The read controller 100 includes an LED driving circuit 102 and a CCD driving circuit 103.

Under the control of the CPU 101, the LED driving circuit 102 turns on the LED 311 within a time period extending from the reading start timing to the reading end timing described above. The CCD driving circuit 103 causes the CCD 33 to execute a reading process during this time period under the control of the CPU 101.

Furthermore, the read controller 100 also includes an analog processing circuit 104, an analog-to-digital (A/D) conversion circuit 105, a shading correction circuit 106, and an output delay circuit 107.

The analog processing circuit 104 receives RGB-expressing image signals obtained by the CCD 33. Under the control of the CPU 101, the analog processing circuit 104 performs analog processing, such as amplification, on these image signals. The A/D conversion circuit 105 performs A/D conversion on the image signals that have been analog-processed by the analog processing circuit 104, thereby generating digital image data expressing RGB colors. The shading correction circuit 106 performs so-called shading correction on the image expressed by the RGB image data so as to correct unevenness in brightness. The output delay circuit 107 performs delay processing in which the output timings of GB image data are delayed to match the output timing of R image data so that RGB image data for each pixel is recognized as image data for that pixel.

A combination of the CPU 101, the LED driving circuit 102, the CCD driving circuit 103, the analog processing circuit 104, the A/D conversion circuit 105, the shading correction circuit 106, and the output delay circuit 107 corresponds to an example of an image data generator according to an exemplary embodiment of the present invention.

The read controller 100 includes a first image storage memory 108. The first image storage memory 108 stores the RGB image data expressing the image within the reading region and having undergone the delay processing performed by the output delay circuit 107. The first image storage memory 108 stores the RGB image data obtained in the current reading process until YMCK image data, to be described later, converted from the RGB image data is transmitted to the image forming section 1B. While the RGB image data is stored in the first image storage memory 108, if new image data is generated in a subsequent reading process, the new image data is additionally stored in the first image storage memory 108. The first image storage memory 108 corresponds to an example of an image memory according to an exemplary embodiment of the present invention.

As described above, in the present exemplary embodiment, the reading width for the currently fed document is determined by the CPU 101, and the reading process is performed within the determined reading width.

The volume of image data converted from the image signal obtained in this reading process is smaller than the volume of image data obtained when, for example, a reading process is performed to a region protruding from the reading width. Consequently, an area occupied in the first image storage memory 108 when a reading process for a single document is performed is reduced. Thus, in the present exemplary embodiment, image data corresponding to a larger number of documents may be stored in the first image storage memory 108, as compared with a case where a reading process is performed to a region protruding from the reading width.

The CPU 101 extracts RGB image data expressing the image within the target reading region of the document with the ascertained size in the ascertained position from the RGB image data stored in the first image storage memory 108.

As described above, if the currently fed document is a B5-size document in the horizontal position, a B4-size document in the horizontal position, an A3-size document in the horizontal position, a B5-size document in the vertical position, or an A4-size document in the vertical position, the target reading region of the document matches the actually read region. Therefore, with regard to such documents, the CPU 101 directly reads the RGB image data stored in the first image storage memory 108.

If the currently fed document is an A5-size document in the horizontal position, an A4-size document in the horizontal position, or an A5-size document in the vertical position, the target reading region of the document and the actually read region match in the longitudinal direction but do not match in the width direction. Therefore, with regard to such documents, the CPU 101 extracts RGB image data expressing the image within the target reading region from the RGB image data stored in the first image storage memory 108.

In the present exemplary embodiment, a pixel range corresponding to a target reading region for each of an A5-size document in the horizontal position, an A4-size document in the horizontal position, and an A5-size document in the vertical position is stored in a memory (not shown). The CPU 101 refers to the stored content in this memory (not shown) so as to ascertain the pixel range corresponding to the target reading region of the document with the ascertained size in the ascertained position. Then, the CPU 101 extracts image data within the ascertained pixel range from the RGB image data stored in the first image storage memory 108.

The CPU 101 corresponds to an example of an image extractor according to an exemplary embodiment of the present invention.

By extracting this image data, image data expressing an image within a target reading region to be read from any kind of document placeable on the document tray 11 can be obtained.

Comparative examples to be compared with the present exemplary embodiment will now be described.

In addition to the image-data extracting method as in the present exemplary embodiment, there are two conceivable methods as comparative examples for obtaining image data expressing an image within a target reading region of a fed document.

A first method involves determining the position and the size of a currently fed document as well as a target reading region of the document before the document reading optical system 30 commences a reading process, and then causing the document reading optical system 30 to read an image within the target reading region as a reading region. In this first method, the target reading region of the document is determined on the basis of detection results obtained by sensors equivalent to the reading-width determination sensor 18 and the reading-timing determination sensor 19 in the present exemplary embodiment.

However, in the first method, since a target reading region is determined before the document reading optical system 30 commences a reading process, the movement path should have a sufficient distance between the sensors and the reading position so that the leading edge of the document does not reach the reading position until the target reading region is determined.

The present exemplary embodiment permits a reading process for a wide reading region including a region protruding from the target reading region, and obtains image data expressing the image within the target reading region by extracting it from the image data obtained in the reading process. Therefore, in the present exemplary embodiment, the leading edge of the document reaches the reading position before a target reading region is determined. The image reading section 1A in the present exemplary embodiment is small and has a shorter movement path than that in an image reading section that employs the first method in which a target reading region is determined before the document reading optical system 30 commences a reading process.

In a second method as another comparative example, a document reading process commences before a target reading region is determined, but if the target reading region determined after the start of the reading process does not match the reading region during the reading process, the document reading process is repeated. In this second method, the document reading process is sometimes repeated twice or more.

The present exemplary embodiment permits a reading process for a wide reading region including a region protruding from the target reading region, so that the document reading process is performed only once. The image reading section 1A in the present exemplary embodiment achieves a higher reading rate than an image reading section that employs the second method in which the document reading process is repeated when the target reading region does not match the reading region.

The read controller 100 further includes an image detection circuit 109, an image processing circuit 110, and a second image storage memory 111.

The RGB image data expressing the image within the target reading region and extracted by the CPU 101 in the above-described manner is transmitted to the image detection circuit 109 and the image processing circuit 110. Based on the transmitted image data, the image detection circuit 109 performs a background-color detecting process for detecting the background color, which is the color of paper used for the document, in the image expressed by the image data. Moreover, based on the transmitted image data, the image detection circuit 109 also performs a color/monochrome determination process for determining whether the image expressed by the image data is a color image or a monochrome image. The detection result of the background-color detecting process and the determination result of the color/monochrome determination process are transmitted to the image processing circuit 110.

The image processing circuit 110 performs a color conversion process for converting the transmitted RGB image data into YMCK image data. In this color conversion process, the detection result of the background-color detecting process and the determination result of the color/monochrome determination process transmitted from the image detection circuit 109 are used.

In the present exemplary embodiment, if a command is input from the user, the image forming section 1B forms an image expressed by image data obtained by reading each of documents of mixed sizes, i.e., multiple documents having different sizes, onto an A4-size sheet set in the horizontal position.

Therefore, if a command is input from the user and the image data expresses an image within a target reading region of a document in the vertical position, the image processing circuit 110 performs a rotation process for converting the image data into image data that expresses the image rotated by 90° from the image expressed by the pre-converted image data.

If the image data expresses an image within a target reading region of a document having a size that is larger than A4 size, the image processing circuit 110 performs a demagnification process for converting the image data into image data that expresses the image reduced to A4 size from the image expressed by the pre-converted image data. This demagnification process also includes performing a decimation process for reducing the transmitted image data to image data with a volume according to the reduction ratio.

If the image data expresses an image within a target reading region of a document having a size that is smaller than A4 size, the image processing circuit 110 performs a magnification process for converting the image data into image data that expresses the image magnified to A4 size from the image expressed by the pre-converted image data.

The YMCK image data having undergone the various kinds of processes in the image processing circuit 110 is stored in the second image storage memory 111.

In the present exemplary embodiment, the first image storage memory 108 that stores pre-extracted RGB image data and the second image storage memory 111 that stores extracted YMCK image data are individually provided. Alternatively, the pre-extracted RGB image data and the extracted YMCK image data may be stored in two different storage areas of a single memory.

Furthermore, in the present exemplary embodiment, the second image storage memory 111 that stores the extracted YMCK image data is provided in the image reading section 1A. Alternatively, the second image storage memory 111 that stores the extracted YMCK image data may be provided in the image forming section 1B.

The CPU 101 reads the YMCK image data from the second image storage memory 111 and transmits the YMCK image data to the exposure controller 41 in the image forming section 1B shown in FIG. 2 in accordance with the aforementioned exposure timing for latent-image formation. Then, the image forming section 1B forms an image on the sheet P on the basis of the transmitted YMCK image data.

Furthermore, in the present exemplary embodiment, although the image reading section 1A included in the copier 1 is described as an example of an image reading device according to an exemplary embodiment of the present invention, the image reading device according to the exemplary embodiment of the present invention is not limited to an image reading section included in a copier. For example, the image reading device according to the exemplary embodiment of the present invention may alternatively be an image reading scanner or an image reading section included in a facsimile apparatus.

Furthermore, in the present exemplary embodiment, although the copier 1 is described as an example of an image forming apparatus according to an exemplary embodiment of the present invention, the image forming apparatus according to the exemplary embodiment of the present invention is not limited to a copier. The image forming apparatus according to the exemplary embodiment of the present invention may alternatively be, for example, a facsimile apparatus.

Furthermore, in the present exemplary embodiment, a reading width is determined when commanding an image reading process. Alternatively, for example, the image data generator according to the exemplary embodiment of the present invention may be configured to unconditionally command a reading process over a maximum reading width that can be read in the image reading device.

Furthermore, in the present exemplary embodiment, when determining the reading width for a currently fed document, a detection result obtained by a sensor that detects the passing of the document is used. Alternatively, for example, the image data generator according to the exemplary embodiment of the present invention may be equipped with a sensor that detects the position of the damper 11b (see FIG. 3) so as to determine the reading width on the basis of the detection result.

Furthermore, the present exemplary embodiment corresponds to a type that performs a reading process after determining the reading width for a currently fed document, and that ascertains the position and the size of the document so as to extract image data expressing an image within a target reading region that corresponds to the position and the size of the document. However, the image reading device according to the exemplary embodiment of the present invention is not limited to this type. The image reading device according to the exemplary embodiment of the present invention may alternatively be configured to perform a reading process over a maximum reading width that can be read in the image forming apparatus, and determine the width or the length of the document from a difference in density between the document and the background by using an image reading sensor so as to perform an image extracting process.

Furthermore, in the present exemplary embodiment, when extracting image data expressing an image within a target reading region, a detection result obtained by a sensor that detects the passing of a document is used. Alternatively, for example, the image extractor according to the exemplary embodiment of the present invention may be configured to extract image data by performing an image analysis.

Figure 5:
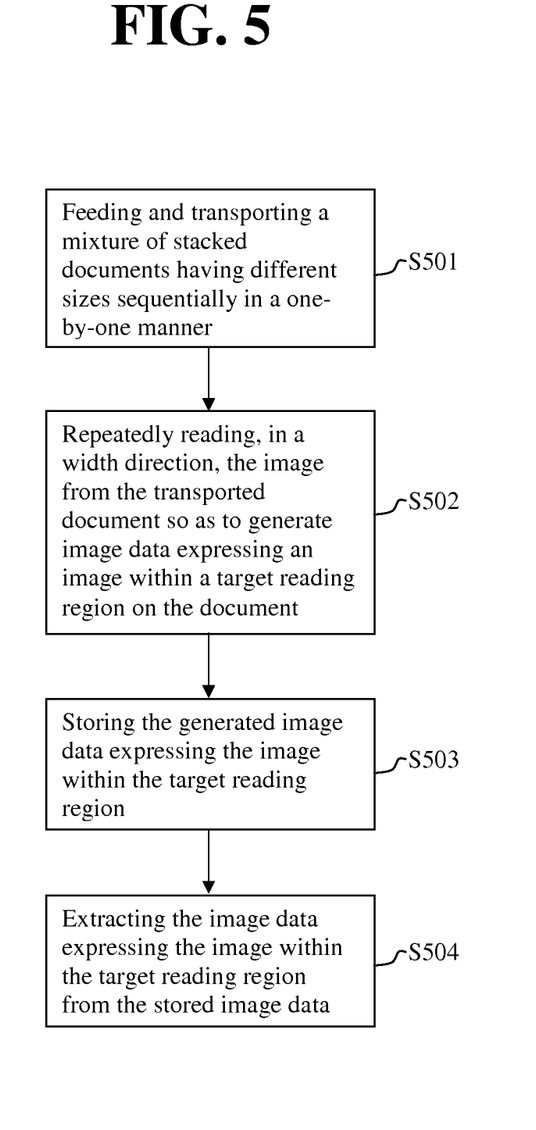
FIG. 5 is a flowchart of an image reading method according to an exemplary embodiment.

FIG. 5 is a flowchart of an image reading method according to an exemplary embodiment, performed by the image reading device 1 illustrated in FIGS. 1 and 2. Referring to FIG. 5, a mixture of stacked documents having different sizes are fed and transported sequentially in a one-by-one manner, in operation S501. Furthermore, in operation S502, the image from each transported document is repeatedly read, in a width direction intersecting a moving direction of each transported document, so as to generate image data expressing an image within a target reading region on the document. In this case, the reading process may include performing reading to a region protruding from the target reading region so that a reading region that does not cause unread parts within the target reading region is read. In operation S503, the generated image data expressing the image within the target reading region is stored. Furthermore, in operation S504, the image data expressing the image within the target reading region is extracted from the stored image data. As described with reference to FIG. 2, the target reading region is determined according to a width identification operation on a document while the document is fed and transported.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a document tray on which documents having images recorded thereon are placed in a stacked manner, the document tray allowing a mixture of the documents having different sizes to be placed thereon;
a document transport mechanism that sequentially feeds and transports the documents placed on the document tray in a one-by-one manner;
an image data generator that extends in a width direction intersecting a moving direction of each document transported by the document transport mechanism and that has an image reading sensor that repeatedly reads, in the width direction, the image from each document fed and transported from the document tray, wherein the image data generator generates image data expressing an image within a target reading region of a currently fed document from the document transport mechanism by permitting the image reading sensor to perform a reading process to a region protruding from the target reading region so as to cause the image reading sensor to perform the reading process over a reading region that does not cause unread parts within the target reading region;
an image memory that stores the image data generated by the image data generator and expressing the image within the target reading region; and
an image extractor that extracts the image data expressing the image within the target reading region from the image data stored in the image memory,
wherein a leading edge of the document reaches a reading position before the target reading region is determined.

2. The image reading device according to claim 1, wherein the image data generator performs the reading process over the reading region having a maximum reading width or a maximum reading length that is readable in the image reading device so as to generate image data expressing an image within the reading region.

3. The image reading device according to claim 1, further comprising a document-width identification sensor that is disposed upstream of the image reading sensor in a movement path of each document fed by the document transport mechanism and that identifies a group to which the currently fed document belongs from among a plurality of groups classified according to sizes of the documents in the width direction,
wherein, in response to an identification result of the document-width identification sensor, the image data generator reads an image within the reading region in accordance with the group to which the document belongs with respect to the width direction.

4. The image reading device according to claim 1, further comprising a document passing detection sensor that is disposed upstream of the image reading sensor in a movement path of each document fed by the document transport mechanism and that detects passing of a trailing edge of the document,
wherein when the document passing detection sensor detects that the trailing edge of the currently fed document has passed the document passing detection sensor, the image data generator causes the image reading sensor to perform the reading process to a trailing edge of the target reading region of the document in the moving direction.

5. An image forming apparatus comprising:

an image reading section that reads an image from a document having an image recorded thereon so as to generate image data within a target reading region of the document; and an image forming section that forms the image on a recording medium on the basis of the image data generated by the image reading section, wherein the image reading section includes
- a document tray on which documents having images recorded thereon are placed in a stacked manner, the document tray allowing a mixture of the documents having different sizes to be placed thereon,
- a document transport mechanism that sequentially feeds and transports the documents placed on the document tray in a one-by-one manner,
- an image data generator that extends in a width direction intersecting a moving direction of each document transported by the document transport mechanism and that has an image reading sensor that repeatedly reads, in the width direction, the image from the document fed and transported from the document tray, wherein the image data generator generates image data expressing an image within a target reading region of a currently fed document from the document transport mechanism by permitting the image reading sensor to perform a reading process to a region protruding from the target reading region so as to cause the image reading sensor to perform the reading process over a reading region that does not cause unread parts within the target reading region,
- an image memory that stores the image data generated by the image data generator and expressing the image within the target reading region, and
- an image extractor that extracts the image data expressing the image within the target reading region from the image data stored in the image memory, wherein a leading edge of the document reaches a reading position before the target reading region is determined.

6. An image reading method comprising:

placing documents having images recorded thereon in a stacked manner, the documents including a mixture of documents having different sizes;

feeding and transporting the documents sequentially in a one-by-one manner;

repeatedly reading, in a width direction intersecting a moving direction of each transported document, the image from the transported document so as to generate image data expressing an image within a target reading region on the document, the reading process including performing reading to a region protruding from the target reading region so that a reading region that does not cause unread parts within the target reading region is read;

storing the generated image data expressing the image within the target reading region; and extracting the image data expressing the image within the target reading region from the stored image data, wherein a leading edge of the document reaches a reading position before the target reading region is determined.

* * * * *